US006726093B2

(12) United States Patent
Hsu et al.

(10) Patent No.: US 6,726,093 B2
(45) Date of Patent: Apr. 27, 2004

(54) KEYBOARD AND KEY STRUCTURE WITH SCISSORS-SHAPED FRAME

(75) Inventors: Chien-Shih Hsu, Taipei (TW); Chi-Pin Yeh, Tainan (TW)

(73) Assignee: Darfon Electronics Corp., Taoyuan (TW)

( * ) Notice: Subject to any disclaimer, the term of this patent is extended or adjusted under 35 U.S.C. 154(b) by 20 days.

(21) Appl. No.: 10/115,161

(22) Filed: Apr. 2, 2002

(65) Prior Publication Data

US 2002/0139841 A1 Oct. 3, 2002

(30) Foreign Application Priority Data

Apr. 2, 2001 (TW) ....................................... 90107861 A

(51) Int. Cl.[7] ................................................ G06F 17/00
(52) U.S. Cl. ....................................................... 235/375
(58) Field of Search ................................ 235/375, 381, 235/145 R; 200/344, 302.2, 304; 400/430, 472

(56) References Cited

U.S. PATENT DOCUMENTS

| | | | | |
|---|---|---|---|---|
| 5,021,638 A | * | 6/1991 | Nopper et al. | 235/145 R |
| 5,964,341 A | * | 10/1999 | Tsai | 200/344 |
| 5,969,320 A | * | 10/1999 | Leeper et al. | 235/380 |
| 6,056,457 A | * | 5/2000 | Chao | 400/472 |
| 6,467,683 B2 | * | 10/2002 | Jun | 235/145 R |
| 6,504,120 B2 | * | 1/2003 | Hsu | 200/344 |
| 2001/0027914 A1 | * | 10/2001 | Hsu | 200/344 |

* cited by examiner

*Primary Examiner*—Thien M. Le
(74) *Attorney, Agent, or Firm*—Snell & Wilmer L.L.P.

(57) ABSTRACT

The present invention is related to a key structure with scissors-shaped frame and a keyboard including the key. The key structure includes a base, a cap, a balance bar, and a scissors-shaped frame. The cap moves vertically relative to the base due to the movement of scissors-shaped frame. The scissors-shaped frame includes a first end portion, a second end portion, a third end portion, and a fourth end portion. The first and second end portions are coupled to the cap, and the third and fourth end portions are coupled to the base. The balance bar connects to the second end portion.

14 Claims, 6 Drawing Sheets

KEYBOARD AND KEY STRUCTURE WITH SCISSORS-SHAPED FRAME

CROSS REFERENCE TO RELATED APPLICATIONS

This Application claims priority to Taiwan Application No. 090107861 entitled "Key Structure with Scissors-Shaped Frame and a Keyboard Including the Key", filed Apr. 2, 2001.

FIELD OF THE INVENTION

The present invention generally relates to keyboards.

BACKGROUND OF THE INVENTION

Keyboards are widely used with various devices, such as computers, to input characters and numerals. To make a key on the keyboard easy to depress, the key is usually designed to function no matter where a force is exerted on the key cap. In other words, even though the force is exerted on the edge of the cap, the force is generally equally distributed over the entire surface of the cap using a scissors-shaped frame for each key. Force distribution is especially important for keyboards used in portable computing devices, which typically require minimal space.

Force distribution is also important in keys of longer width, such as the "space" key and the "shift" key, which typically require additional structure to balance the force exerted on the end of the cap. Generally, a balance bar is disposed under the key cap to balance a force exerted on the end of the cap across the width of the key. By this arrangement, the key may be levelly depressed downwardly even when the force is exerted only on one end of the cap. The balance bar may be disposed on the external side of the scissors-shaped frame such that the balance bar is separated from the frame, as discussed more fully below.

FIGS. 1 and 2 depict the bottom view and side view of a conventional scissors-shaped key structure, respectively. Conventionally, the key structure includes a base 4, a cap 1, a scissors-shaped frame 2, an elastic element (not shown), and a switch element (not shown). Multiple-width keys (such as the space bar) typically further include a balance bar 3. As FIGS. 1 and 2 show, a distance "d" between frame 2 and bar 3 is allocated to dispose the balance bar 3. Thus, the projection area of scissors-shaped frame 2 is reduced to accommodate balance bar 3. Particularly, a second end portion 22 of the frame 2*a* moves back the distance "d" to dispose balance bar 3. Additionally, the stroke of the scissors-shaped frame 2 is typically a fixed value. The height of the key 10 is difficult to reduce due to the distance "d" and the fixed stroke. Those factors are negative to produce a super-slim key structure.

SUMMARY OF THE INVENTION

To solve the problems described above, the present invention discloses a key with scissors-shaped frame, and a keyboard that implements such keys. The key includes a base, a cap, a balance bar, and a scissors-shaped frame. The cap moves vertically relative to the base due to the movement of scissors-shaped frame. The scissors-shaped frame includes a first end portion, a second end portion, a third end portion, and a fourth end portion. The first and second end portions are coupled to the cap, and the third and fourth end portions are coupled to the base. The balance bar may be connected to the second end portion of the scissors-shaped frame, rather than directly to the cap, as appropriate.

In another embodiment, the second end portion is coupled to the cap.

In another embodiment, the second end portion includes a slot to receive the balance bar.

BRIEF DESCRIPTION OF THE DRAWINGS

The various features and advantages are hereinafter described in the following detailed description of illustrative embodiments to be read in conjunction with the accompanying drawing figures, wherein like reference numerals are used to identify the same or similar parts in the similar views, and.

DETAILED DESCRIPTION

Figure 1:
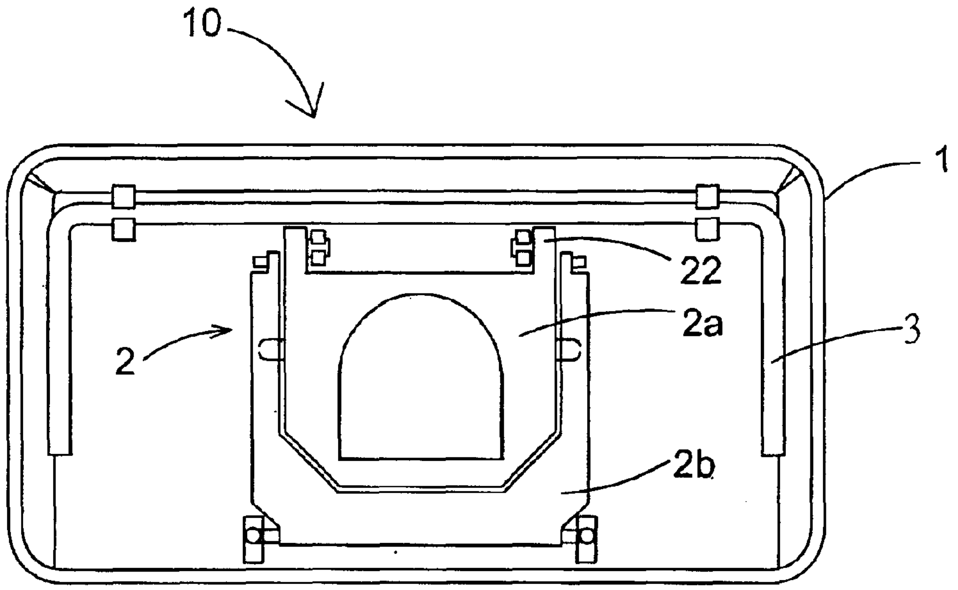
Fig.1(Prior Art)
FIG. 1 depicts the bottom view of a conventional scissors-shaped key.
Figure 2:
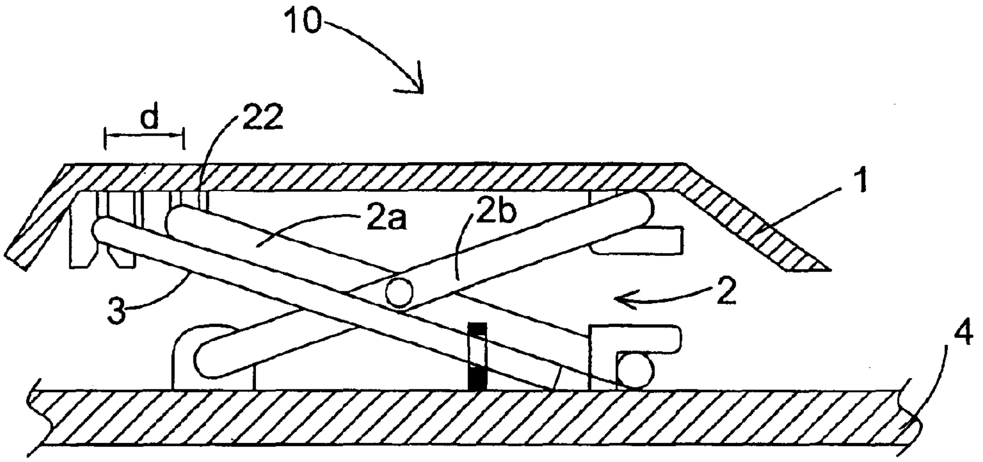
Fig.2(Prior Art)
FIG. 2 depicts the side view of the conventional scissors-shaped key shown in FIG. 1.
Figure 3:
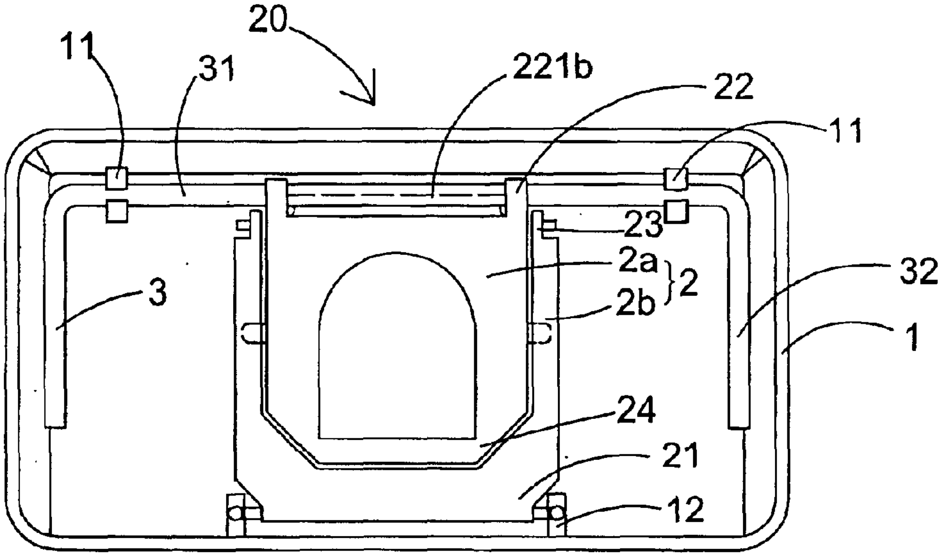
FIG. 3 depicts the bottom view of the scissors-shaped key of a first exemplary embodiment of the present invention.
Figure 4:
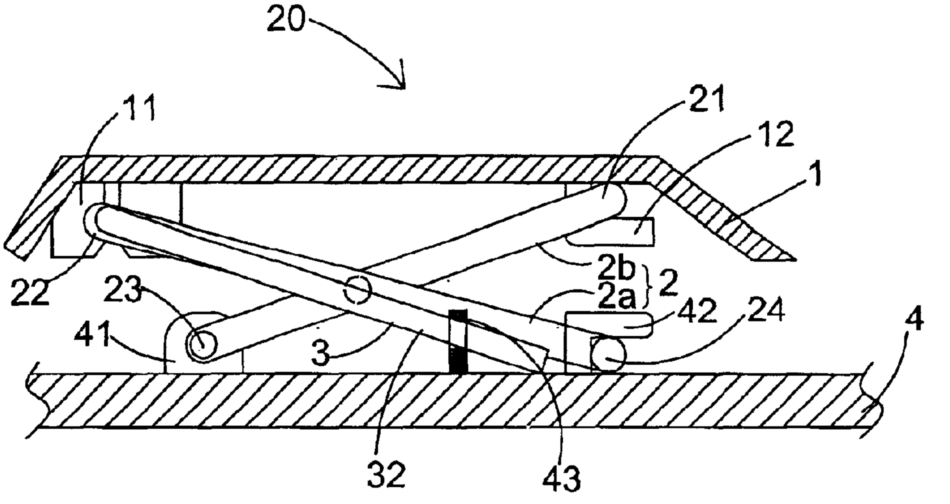
FIG. 4 depicts the side view of the scissors-shaped key shown in FIG. 3.
Figure 5:
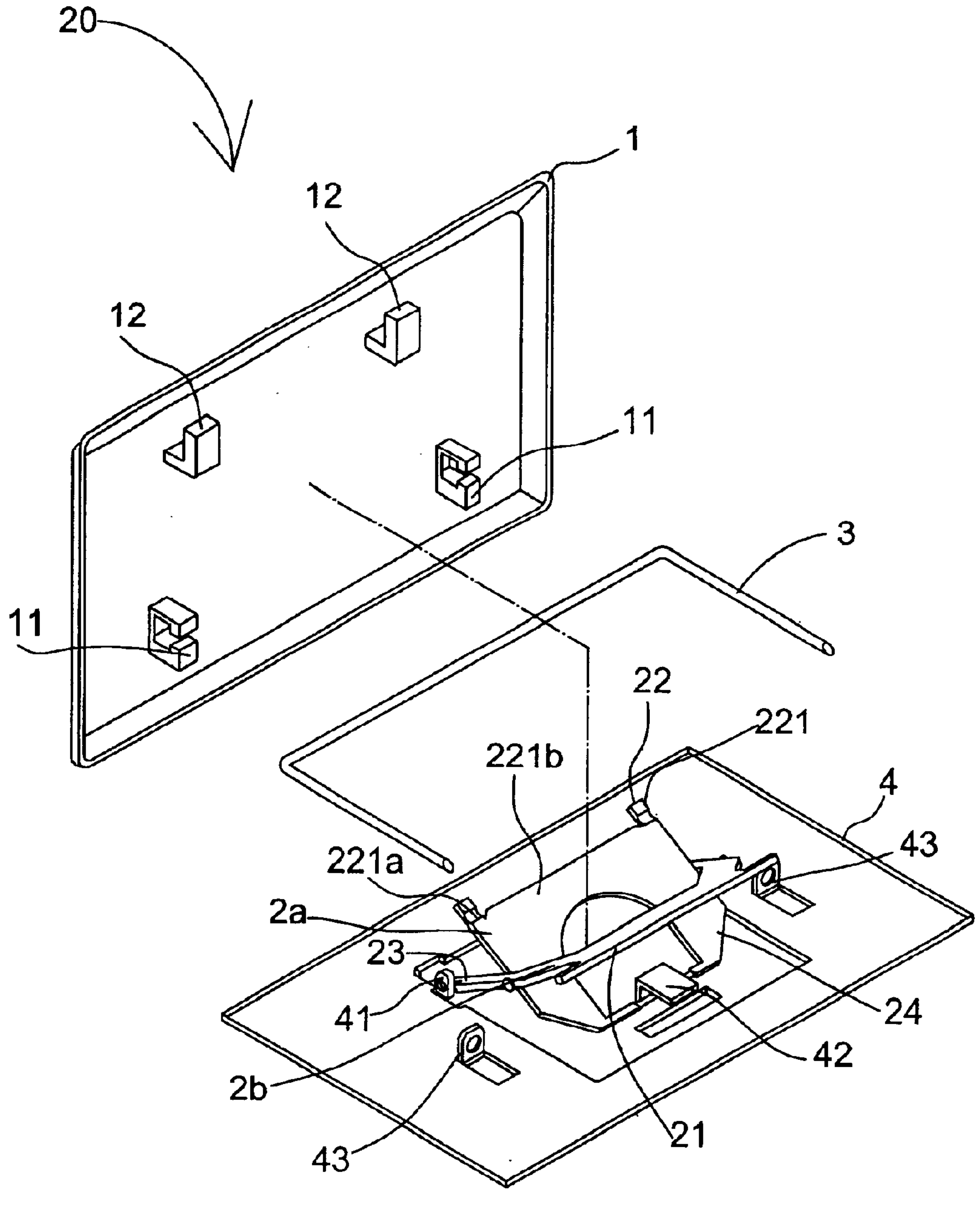
FIG. 5 is an explosive view of the scissors-shaped key shown in FIG. 3.

FIGS. 3, 4, and 5 describe a first exemplary embodiment of the present invention. In the first exemplary embodiment, a scissors-shaped key 20 includes a cap 1, a scissors-shaped frame 2, a balance bar 3, and a base 4. Cap 1 is disposed on the base 4. The scissors-shaped frame 2 is disposed between the base 4 and cap 1. The balance bar 3 includes a first end 31 and a second end 32. The first end 31 is pivotally coupled to a pivoting support 11 disposed on the bottom of the cap 1. The second end 32 passes through a corresponding ditch 43 disposed on the base 4, as appropriate.

The scissors-shaped frame 2 includes a first end portion 21, a second end portion 22, a third end portion 23, and a fourth end portion 24. The first end portion 21 is coupled to a chute 12 disposed on the bottom of the cap 1. The second end portion 22 is coupled to the balance bar 3. The third end portion is coupled to a pivoting support 41 disposed on the base 4. The fourth end portion 24 is coupled to a chute 42 disposed on the base 4. The cap 1 may move vertically relative to the base 4 due to the action of balance bar 3 and the scissors-shaped frame 2.

Two frames 2*a* and 2*b*, wherein the frame 2*a* is pivotally coupled to the frame 2*b*, constitute the scissors-shaped frame 2. The scissors-shaped frame 2 elevates and drops cap 1 due to the relative rotation between the frames 2*a* and 2*b*. Moreover, the ends of the frames 2*a* and 2*b*, known as the first to the fourth end portions, 21 to 24, are selectively coupled to cap 1 and base 4 respectively with various combinations. For example, all of the end portions 21 to 24 may be rotatably coupled to the cap 1 or base 4 respectively, and frame 1 may be slidably coupled to frame 2. The end portions may also be coupled to cap 1 or base 4 rotatably and movably. The balance bar 3 is connected to the second end portion 22 of the scissors-shaped frame 2, as appropriate.

Figure 6:
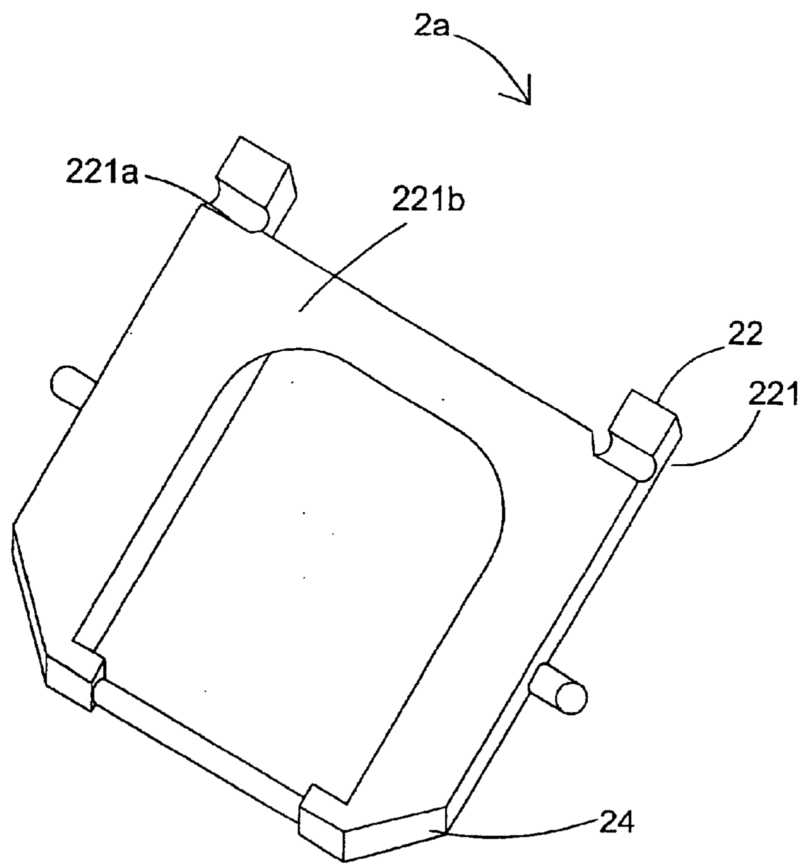
FIG. 6 illustrates a second end portion of the scissors-shaped key shown in FIG. 3.

Please refer to FIG. 6. In this embodiment, the second end portion 22 of the frame 2*a* further includes a retainer 221 for retaining the balance bar 3. In the embodiment shown in the figure, retainer 221 is implemented as a slot 221*a* or groove configured to receive balance bar 3. Moreover, retainer 221 may further include a protrusion 221*b* to hold balance bar 3 in slot 221*a*.

Figure 7:
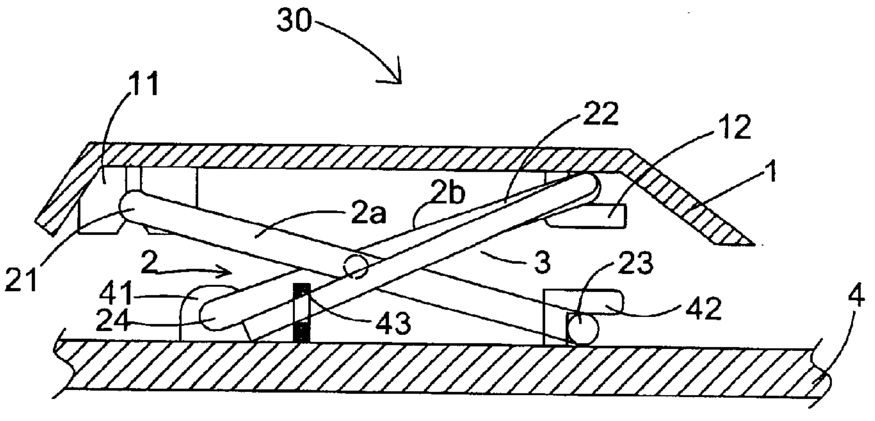
FIG. 7 depicts a side view of the scissors-shaped key of a second exemplary embodiment of the present invention.

FIG. 7 depicts a side view of the scissors-shaped key used in a second exemplary embodiment of the present invention. In accordance with the comparison between FIG. 4 and FIG. 7, the different between the first embodiment and the second embodiment may be observed and illustrated below. Differing from the first embodiment, the second end portion 22 of the second embodiment shown in FIG. 7 is disposed on the frame 2*b*. The balance bar 3 is coupled to the chute 12 disposed on the bottom of the cap 1 to form a slidable pivot. The second end portion 22 disposed on the frame 2*b* connects to the balance bar 3. In other words, the balance bar 3 is rotatably coupled to the pivoting support 11 disposed on the bottom of the cap 1. The balance bar 3 also may be slidably and rotatably coupled to the chute 12 disposed on the bottom of the cap 1. Additionally, the balance bar 3 may be connected to any of the frames of the scissors-shaped frame 2.

Figure 8:
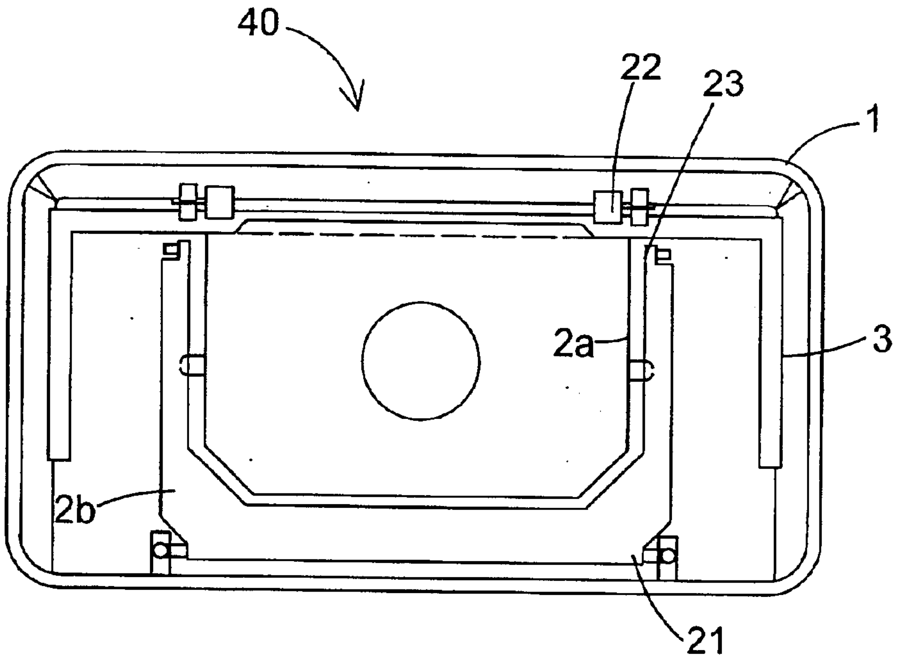
FIG. 8 depicts the bottom view of the scissors-shaped key recited in a third exemplary embodiment of the present invention.
Figure 9:
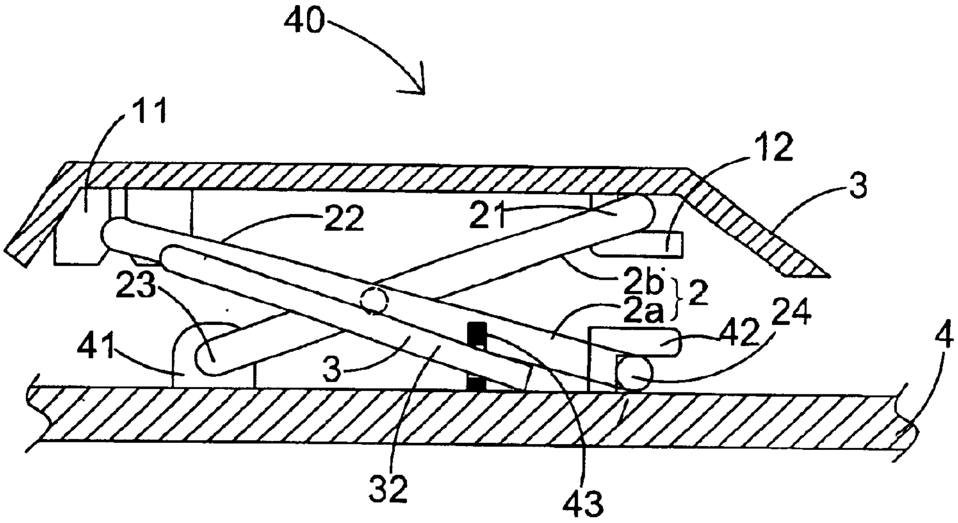
FIG. 9 depicts the side view of the scissors-shaped key shown in FIG. 8.

FIGS. 8 and 9 show a third exemplary embodiment of the present invention. Different from the first embodiment shown in FIGS. 3 and 4, the second end portion 22 of the frame 2*a* of the scissors-shaped frame 2 is coupled to the pivoting support 11 disposed on bottom of the cap 1. The balance bar 3 connects to the second end portion 22. Specifically, the second end portion 22 slots the balance bar 3 to make the connection.

As FIG. 9 shows, the first end portion 21 of the frame 2*b* of the scissors-shaped frame 2 is slidably coupled to the chute 12 disposed on the bottom of the cap 1. The second end portion 22 of the frame 2*a* is rotatably coupled to the pivoting support 11 disposed on the bottom of the cap 1. A slot is disposed at the frame 2*a* in proximity to the second end portion 22 for slotting the balance bar 3 to make the connection between balance bar 3 and the frame 2*a*.

Figure 10:
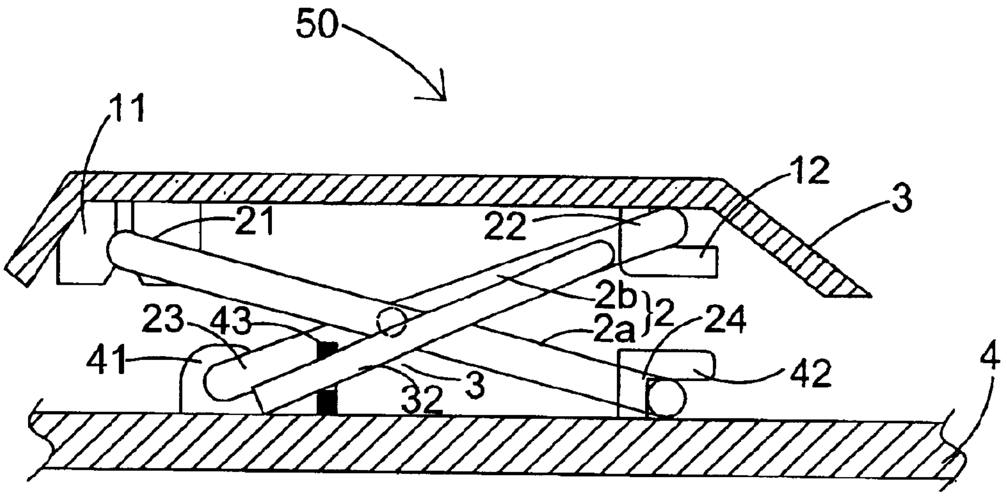
FIG. 10 depicts the side view of a fourth embodiment of the present invention.

FIG. 10 depicts a side view of the fourth embodiment of the present invention. In this embodiment, a slot is disposed at the frame 2*b* in proximity to the second end portion 22 for slotting the balance bar 3 to make a connection between the balance bar 3 and the frame 2*b*. Additionally, the first end portion 21 of the frame 2*a* of the scissors-shaped frame 2 is rotatably coupled to the pivoting support 11 disposed on the bottom of the cap 1. The second end portion 22 of the frame 2*b* is slidably coupled to the chute 12 disposed on the bottom of the cap 1.

The above description sets forth various exemplary embodiments of the invention only, and is not intended to limit the scope, applicability, or configuration of the invention in any way. Rather, various changes may be made in the function and arrangement of the elements described in these embodiments without departing from the spirit and scope of the invention. Thus, the protected scope of the present invention is as set forth in the appended claims.

What is claimed is:

1. A key structure comprising:

a base;

a cap;

a balance bar disposed between the base and the cap, said balance bar having a first end coupled to the cap and a second end coupled to the base; and a scissors-shaped frame disposed between the base and the cap, said scissors-shaped frame having a first end portion, a second end portion, a third end portion, and a fourth end portion, the first end portion being coupled to the cap, the second end portion being coupled to the first end of the balance bar, the third and fourth end portions being coupled to the base;

wherein the cap moves vertically relative to the base due to the action of the balance bar and the scissors-shaped frame.

2. The key structure of claim 1, wherein the second end portion further comprises a retainer for retaining the balance bar.

3. The key structure of claim 2, wherein the retainer further comprises a slot to receive the balance bar.

4. The key structure of claim 2, wherein the retainer further comprises a protrusion to hold the balance bar.

5. The key structure of claim 1, wherein the first end portion of the scissors-shaped frame is slidably coupled to the cap, and the first end of the balance bar is rotatably coupled to the cap.

6. The key structure of claim 1, wherein the first end portion of the scissors-shaped frame is rotatably coupled to the cap, and the first end of the balance bar is slidably coupled to the cap.

7. A keyboard comprising a plurality of keys, at least some of said plurality of keys having a long key structure comprising:

a base;

a cap;

a balance bar, disposed between the base and the cap, said balance bar having a first end coupled to the cap and a second end coupled to the base; and a scissors-shaped frame disposed between the base and the cap, said scissors-shaped frame having a first end portion, a second end portion, a third end portion, and a fourth end portion, the first end portion being coupled to the cap, the second end portion being coupled to the first end of the balance bar, the third and fourth end portions being coupled to the base;

wherein the cap moves vertically relative to the base due to the action of the balance bar and the scissors-shaped frame.

8. A key structure comprising:

a base;

a cap;

a balance bar disposed between the base and the cap, said balance bar having a first end and a second end, said second end coupled to the base; and a scissors-shaped frame disposed between the base and the cap, said scissors-shaped frame having a first end portion, a second end portion, a third end portion, and a fourth end portion, the first and second end portions being coupled to the cap, the third and fourth end portions being coupled to the base, the cap moving vertically relative to the base due to action of the scissors-shaped frame; wherein the first end connects to the second end portion.

9. The key structure of claim 8, wherein the second end portion further comprises a retainer for retaining the first end of the balance bar.

10. The key structure of claim 9, wherein the retainer further comprises a slot to receive the balance bar.

11. The key structure of claim 9, wherein the retainer further comprises a protrusion to hold the balance bar.

12. The key structure of claim 8, wherein the first end portion is slidably coupled to the cap, and the second end portion is rotatably coupled to the cap.

13. The key structure of claim 8, wherein the first end portion is rotatably coupled to the cap, and the second end portion is slidably coupled to the cap.

14. A keyboard comprising a plurality of keys, at least one of said plurality of keys comprising:

a base;

a cap;

a balance bar disposed between the base and the cap, said balance bar having a first end and a second end, said second end coupled to the base; and a scissors-shaped frame disposed between the base and the cap, said scissors-shaped frame having a first end portion, a second end portion, a third end portion, and a fourth end portion, the first and second end portions being coupled to the cap, the third and fourth end portions being coupled to the base, the cap moving vertically relative to the base due to action of the scissors-shaped frame;

wherein the first end of said balance bar is coupled to the second end portion of said scissors-shaped frame.

* * * * *